(12) United States Patent
Lee et al.

(10) Patent No.: US 7,628,526 B2
(45) Date of Patent: Dec. 8, 2009

(54) BACK LIGHT UNIT

(75) Inventors: Man Hoan Lee, Kumi-shi (KR); Ji Su Yoon, Seoul (KR); Sung Keun Lee, Kumi-shi (KR); Won Taek Moon, Seoul (KR); Jun Kyu Paik, Seoul (KR); Young Hun Jeong, Seoul (KR)

(73) Assignee: LG Display Co., Ltd., Seoul (KR)

( * ) Notice: Subject to any disclaimer, the term of this patent is extended or adjusted under 35 U.S.C. 154(b) by 205 days.

(21) Appl. No.: 11/312,716

(22) Filed: Dec. 21, 2005

(65) Prior Publication Data

US 2007/0002568 A1 Jan. 4, 2007

(30) Foreign Application Priority Data

Jun. 29, 2005 (KR) ............... 10-2005-0057015

(51) Int. Cl.
*F21V 5/00* (2006.01)

(52) U.S. Cl. .................. 362/607; 362/614; 362/331

(58) Field of Classification Search .......... 362/26, 362/27, 613, 614, 626, 628, 331, 620, 634, 362/607; 349/63, 98
See application file for complete search history.

(56) References Cited

U.S. PATENT DOCUMENTS

| | | | | |
|---|---|---|---|---|
| 5,841,572 A | * | 11/1998 | Ando et al. | 359/454 |
| 6,752,507 B2 | * | 6/2004 | Wang et al. | 362/619 |
| 6,880,947 B2 | * | 4/2005 | Hsieh et al. | 362/614 |
| 6,903,788 B2 | * | 6/2005 | Shiraogawa et al. | 349/115 |
| 7,125,155 B2 | * | 10/2006 | Sakuda et al. | 362/632 |
| 7,207,707 B2 | * | 4/2007 | Huang et al. | 362/614 |
| 7,303,323 B2 | * | 12/2007 | Choi et al. | 362/606 |
| 7,330,315 B2 | * | 2/2008 | Nilsen | 359/640 |
| 2001/0050736 A1 | * | 12/2001 | Lee et al. | 349/65 |
| 2002/0080598 A1 | * | 6/2002 | Parker et al. | 362/31 |
| 2005/0281051 A1 | * | 12/2005 | Kim et al. | 362/613 |

\* cited by examiner

*Primary Examiner*—Stephen F. Husar
*Assistant Examiner*—Peggy A. Neils
(74) *Attorney, Agent, or Firm*—McKenna Long & Aldridge

(57) ABSTRACT

A back light unit is disclosed, which improves condensing efficiency of light and viewing angle characteristics. The back light unit includes at least one lamp generating light, a light guide plate emitting light across a surface thereof using the light generated from the lamp, a diffusion sheet arranged above the light guide plate to diffuse the light passing through the light guide plate, a first condensing sheet condensing the light from the diffusion sheet using a plurality of first elliptical condensing patterns arranged on the diffusion sheet in a first direction, and a second condensing sheet further condensing the light from the first condensing sheet using a plurality of second elliptical condensing patterns arranged on the first condensing sheet in a second direction crossing the first direction.

19 Claims, 12 Drawing Sheets

BACK LIGHT UNIT

This application claims the benefit of Korean Patent Application No. P2005-57015, filed on Jun. 29, 2005, which is hereby incorporated by reference for all purposes as if fully set forth herein.

BACKGROUND OF THE INVENTION

1. Field of the Invention

The present invention relates to a back light unit, and more particularly, to a back light unit that improves light condensing efficiency and viewing angle characteristics.

2. Discussion of the Related Art

Recently, various flat panel displays that can reduce weight and volume of a cathode ray tube have been developed. Examples of the flat panel displays include a liquid crystal display (LCD), a field emission display (FED), a plasma display panel (PDP), and a light emitting display (LED).

Among them, the LCD displays desired images by controlling light emitted from a back light unit using an LCD panel. The LCD panel includes a plurality of liquid crystal cells and a plurality of control switches for switching video signals to be supplied to the respective liquid crystal cells.

FIG. 1 illustrates a related art back light unit.

As shown in FIG. 1, the related art back light unit includes a lamp 10 generating light, a light guide plate 20 acting as a surface light source by dispersion of the light generated from the lamp 10 that enters through an incident surface 22, a lamp housing 12 arranged to surround the incident surface 22 of the light guide plate 20 and the lamp 10, a reflecting plate 30 arranged below the light guide plate 20, a diffusion sheet 40 arranged above the light guide plate 20 to diffuse the light passing through the light guide plate 20, and first and second prisms 50 and 60 controlling the direction of the light passing through the diffusion sheet 40.

Generally, the lamp 10 is formed of a cold cathode fluorescent lamp. The lamp 10 is driven by a lamp driving voltage from an inverter (not shown) and emits light to the incident surface 22 at a side of the light guide plate 20.

The lamp housing 12 is arranged at the side of the light guide plate 20 to surround the lamp 10 and the incident surface 22 of the light guide plate 20.

The lamp housing 12 has a reflecting surface therein to reflect the light from the lamp 10 toward the incident surface 22 of the light guide plate 20.

The light guide plate 20 allows the incident light from the lamp 10 to reach a portion away from the lamp 10 and guides the incident light to the diffusion sheet 40.

In other words, a printing pattern is formed on a tilted rear surface of the light guide plate 20 to reflect the light from the incident surface 22 at a predetermined tilt angle from the tilted rear surface and uniformly progress the reflected light to the diffusion sheet 40.

The reflecting plate 30 is arranged below the light guide plate 20 to reflect again the light entering through the rear surface of the light guide plate 20 to the light guide plate 20 so as to reduce light loss.

The diffusion sheet 40 diffuses the light passing through the light guide plate 20 into entire regions and irradiates the light to the first prism sheet 50.

Meanwhile, light incident to a liquid crystal panel (not shown) has great light efficiency when the light vertically enters the liquid crystal panel. In this respect, two forward prism sheets are preferably deposited so that the light emitted from the light guide plate 20 is vertical to the liquid crystal panel.

The first and second prism sheets 50 and 60 serve to condense the light passing through the diffusion sheet 40.

For this, each of the first and second prism sheets 50 and 60, as shown in FIG. 2, includes a condensing film 52 of polyester (PET) and a plurality of prism peaks 54 formed on the condensing film 52 in a stripe shape.

The prism peaks 54 have first and second tilt surfaces tilted from their angular points at a predetermined angle. At this time, each of the first and second tilt surfaces is tilted from a top surface of the condensing film 52 at an angle of 45°.

The incident light with a predetermined angle θ1 to the first and second prism sheets 50 and 60 having a refractive index n1 is refracted by the first and second prism sheets 50 and 60 at a predetermined angle θ2 under the Snell's law expressed in the following equation 1 and then emitted to the outside having a refractive index n2.

$$\frac{n1}{n2} = \frac{\sin\theta 1}{\sin\theta 2} \qquad \text{equation 1}$$

In the aforementioned related art back light unit, the light emitted from the lamp 10 proceeds to the diffusion sheet 40 arranged above the light guide plate 20 through the light guide plate 20, and the light passing through the light guide plate 20 is diffused to the entire regions through the diffusion sheet 40. Then, the diffused light is condensed through the first and second prism sheets 50 and 60. The condensed light is finally emitted to the outside.

However, in the related art back light unit, the incident light to the first and second prism sheets 50 and 60 can be split into three regions, as shown in FIG. 3, i.e., a total reflection region, a condensing region, and a side lobe region.

In more detail, light A of the total reflection region vertically enters the condensing film 52 and is totally reflected by the first and second tilt surfaces of the prism peaks 54. The totally reflected light proceeds again to the light guide plate 20. In this way, the light A is condensed by recycling.

Light B of the condensing region enters the condensing film at a predetermined angle and is condensed in such a manner that it is refracted by the first and second tilt surfaces of the prism peaks 54.

Light C of the side lobe region enters the condensing film 52 at a predetermined angle and is totally reflected by the first and second tilt surfaces of the prism peaks 54. In this case, light efficiency and viewing angle characteristics are deteriorated.

The first and second prism sheets 50 and 60 have a better condensing efficiency in a vertical direction (Y axis) than a condensing efficiency in a horizontal direction (X axis) as shown in FIG. 4 due to a two-dimensional structure of the prism peaks 54.

Therefore, as shown in FIG. 5, a bright region exists at both sides of each of the first and second prism sheets 50 and 60 around a symmetrical point due to the side lobe.

As a result, the related art back light unit has some problems due to the structure of the first and second prism sheets 50 and 60. That is, the viewing angle characteristics deteriorated due to luminance asymmetry in the vertical and horizontal direction (Y and X axes), and condensing efficiency deteriorates due to the side lobe.

SUMMARY OF THE INVENTION

Accordingly, the present invention is directed to a back light unit that substantially obviates one or more problems due to limitations and disadvantages of the related art.

An advantage of the present invention is to provide a back light unit that improves the condensing efficiency of light and viewing angle characteristics.

Another advantage of the present invention is to provide a simplified back light unit.

Additional features and advantages of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a back light unit according to the present invention includes at least one lamp generating light, a light guide plate emitting light across a surface thereof using the light generated from the lamp, a diffusion sheet arranged above the light guide plate to diffuse the light passing through the light guide plate, a first condensing sheet condensing the light from the diffusion sheet using a plurality of first elliptical condensing patterns arranged on the diffusion sheet in a first direction, and a second condensing sheet further condensing the light from the first condensing sheet using a plurality of second elliptical condensing patterns arranged on the first condensing sheet in a second direction crossing the first direction.

In another aspect of the present invention, a back light unit includes at least one lamp generating light, a prism light guide plate emitting light across a surface thereof from the lamp through an incident surface formed at a side of the prism light guide plate, using a plurality of first prism peaks formed in a first direction, a first condensing sheet condensing the light from the prism light guide plate using a plurality of second prism peaks formed in a second direction crossing the first direction, and a second condensing sheet further condensing the light from the first condensing sheet using a plurality of first elliptical condensing patterns formed in the first direction.

In still another aspect of the present invention, a back light unit includes at least one lamp generating light, a prism light guide plate emitting light across a surface thereof from the lamp through an incident surface formed at a side of the prism light guide plate, using a plurality of prism peaks formed in a first direction, and a condensing sheet condensing the light from the prism light guide plate using a plurality of elliptical condensing patterns formed in a second direction crossing the first direction.

In further still another aspect of the present invention, a back light unit includes a plurality of lamps generating light, a bottom cover supporting and receiving the lamps, a diffusion plate arranged to cover a top surface of the bottom cover, diffusing the light from the lamps, a first condensing sheet condensing the light from the diffusion plate using a plurality of first elliptical condensing patterns formed in a first direction, and a second condensing sheet further condensing the light from the first condensing sheet using a plurality of second elliptical condensing patterns formed in a second direction crossing the first direction.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
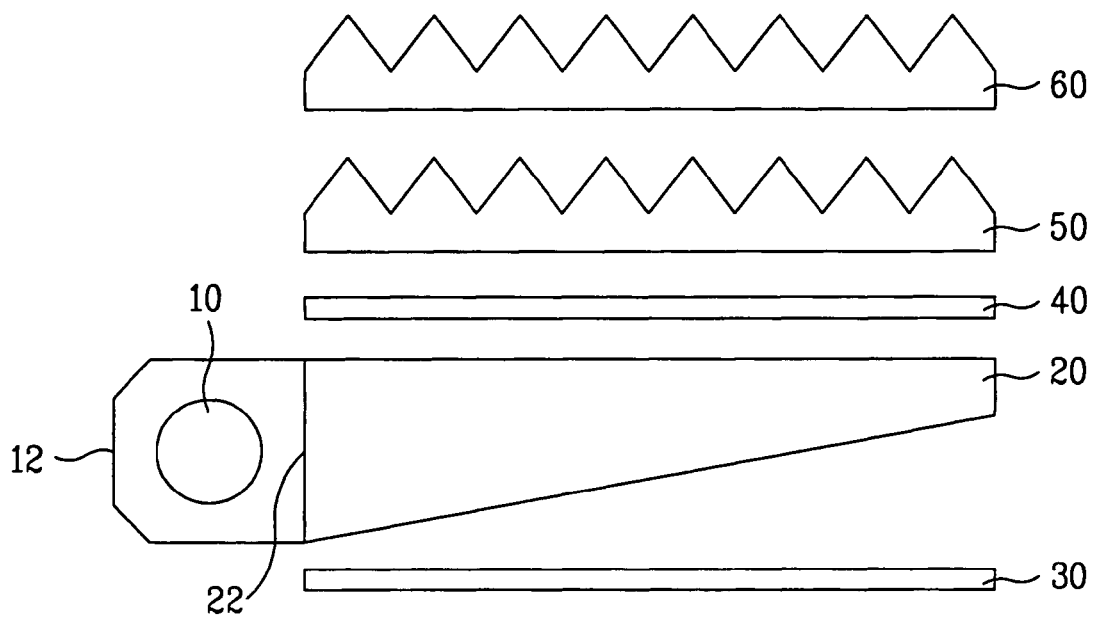
FIG. 1 illustrates a related art back light unit.
Figure 2:
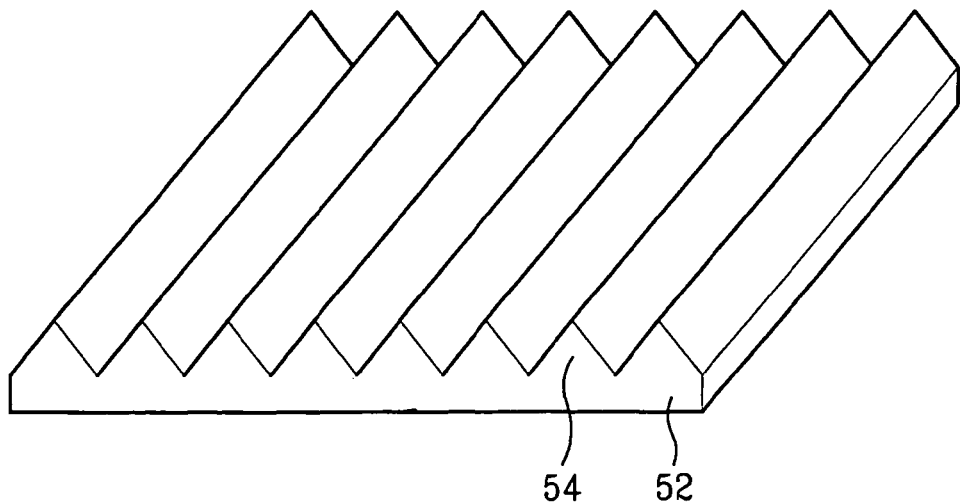
FIG. 2 is a perspective view illustrating prism sheets shown in FIG. 1.
Figure 3:
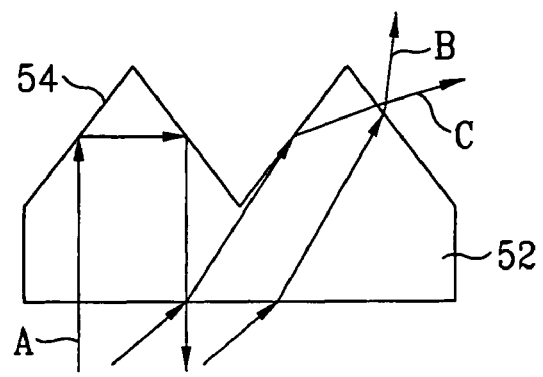
FIG. 3 illustrates light characteristics of prism peaks shown in FIG. 2.
Figure 4:
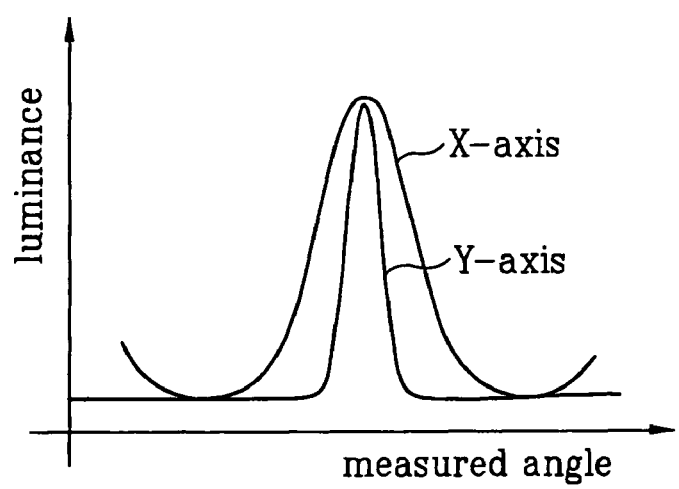
FIG. 4 is a graph illustrating luminance depending on angles of prism sheets shown in FIG. 2.
Figure 5:
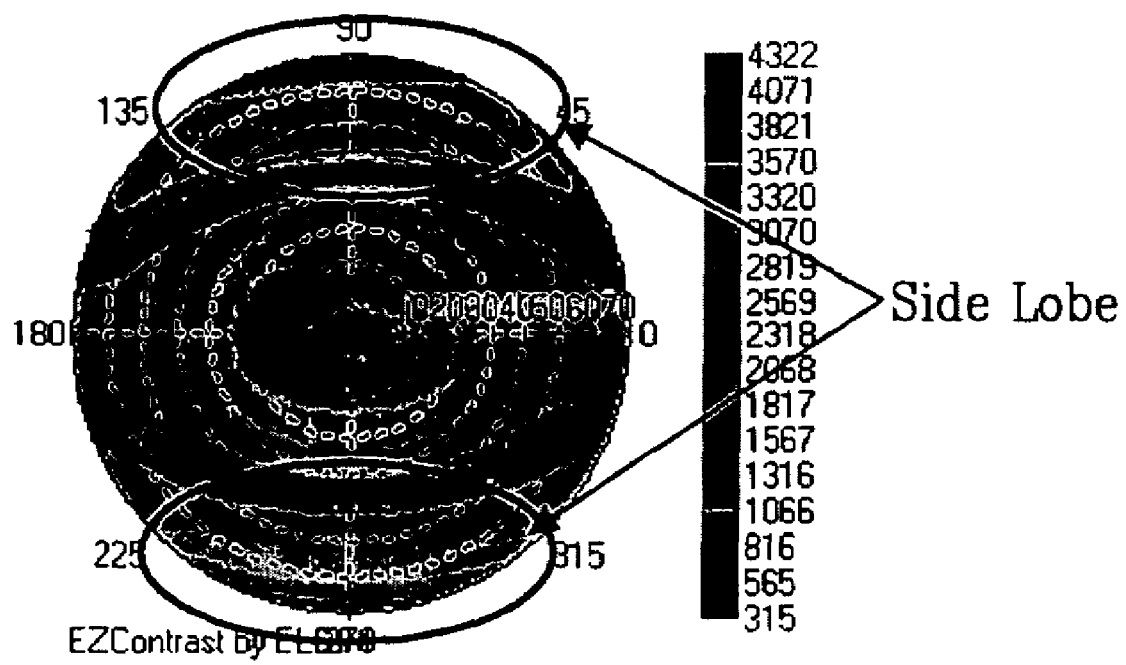
FIG. 5 illustrates light transmittance versus angle of prism sheets shown in FIG. 2.
Figure 6:
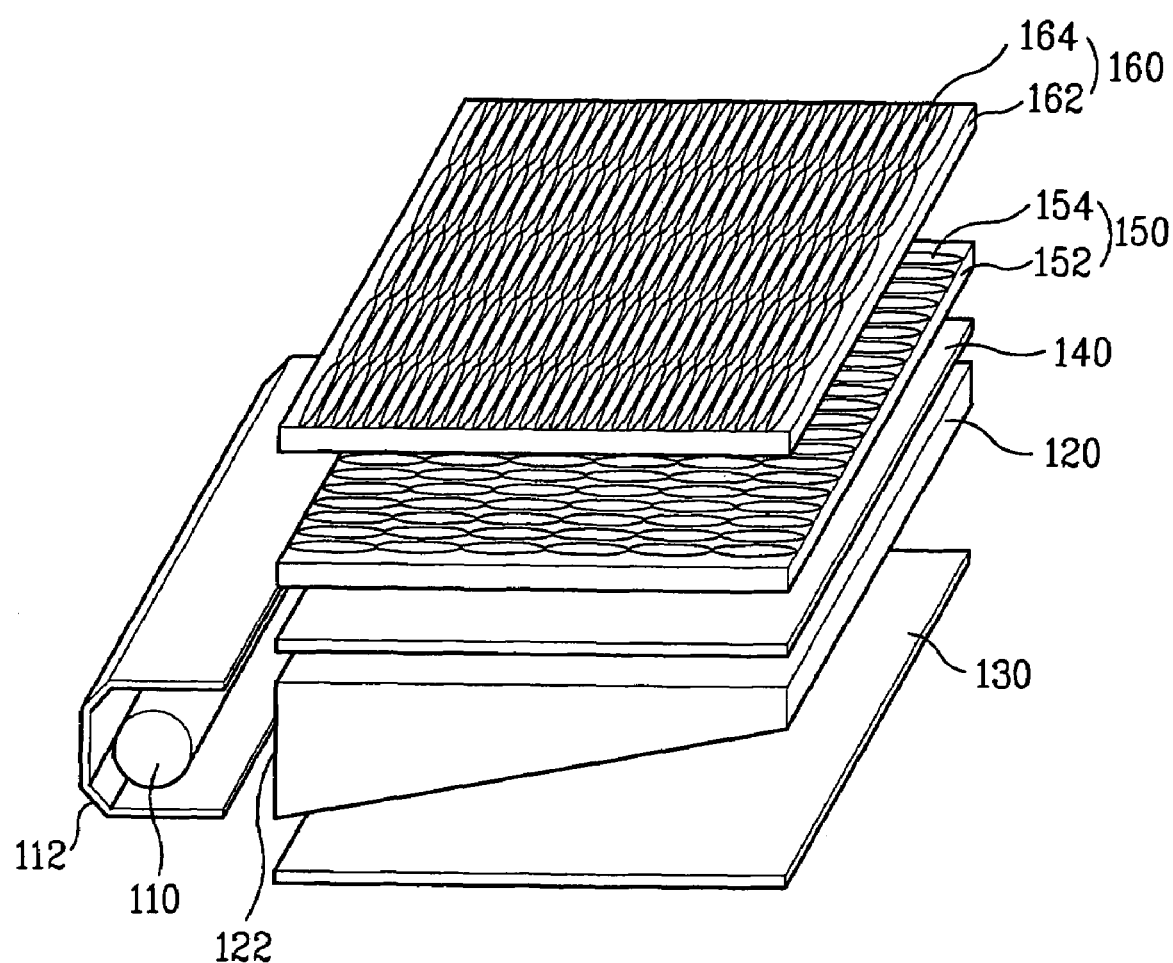
FIG. 6 illustrates a back light unit according to the first embodiment of the present invention.

FIG. 6 illustrates a back light unit according to the first embodiment of the present invention.

As shown in FIG. 6, the back light unit according to the first embodiment of the present invention includes a lamp 110 generating light, a light guide plate 120 acting as a surface light source by dispersion of the light generated from the lamp 110 that enters through an incident surface 122, a lamp housing 112 arranged to surround the incident surface 122 of the light guide plate 120 and the lamp 110, a reflecting plate 130 arranged below the light guide plate 120, a diffusion sheet 140 arranged above the light guide plate 120 to diffuse the light passing through the light guide plate 120, a first condensing sheet 150 condensing the light from the diffusion sheet 140 using a plurality of first elliptical condensing patterns 154 arranged on the diffusion sheet 140 in a first direction (X axis), and a second condensing sheet 160 condensing the light from the first condensing sheet 150 using a plurality of second elliptical condensing patterns 164 arranged on the first condensing sheet 150 in a second direction (Y axis).

Generally, the lamp 110 is a cold cathode fluorescent lamp. The lamp 110 is driven by a lamp driving voltage from an inverter (not shown) and emits light to the incident surface 122 at a side of the light guide plate 120.

The lamp housing 112 is arranged at the side of the light guide plate 120 to surround the lamp 110 and the incident surface 122 of the light guide plate 120. The lamp housing 112 has a reflecting surface therein to reflect the light from the lamp 110 toward the incident surface 122 of the light guide plate 120.

The light guide plate 120 has a wedge shape to allow the light emitted from the lamp 110 to reach a portion farthest away from the lamp 110 and converts the incident light into a plane of light moving towards the diffusion sheet 140.

In other words, a light dispersion pattern is formed below the light guide plate 120 to reflect the light from the incident surface 122 at a predetermined tilt angle from a tilted rear surface to the diffusion sheet 140.

The reflecting plate 130 is arranged below the light guide plate 120 to reflect any light exiting the rear surface of the light guide plate 120 to the light guide plate 120 so as to reduce light loss.

The diffusion sheet 140 diffuses the light passing through the light guide plate 120 across the entire diffusion sheet 140 and irradiates the diffused light to the first and second condensing sheets 150 and 160.

Meanwhile, light incident onto a liquid crystal panel (not shown) has great light efficiency when the light enters the liquid crystal panel. In this respect, two forward prism sheets may be deposited so that the light emitted from the light guide plate 120 is vertical to the liquid crystal panel.

The first condensing sheet 150 includes a first condensing film 152 of polyester(PET) and a plurality of first elliptical condensing patterns 154 formed on the first condensing film 152 in the first direction (X axis).

The first elliptical condensing patterns 154 are formed on a surface of the first condensing film 152 to respectively have an asymmetrical or unbalanced elliptical shape of several μm using a holographic method.

Figure 7:
FIG. 7 is a photograph illustrating a surface of a first condensing sheet shown in FIG. 6.

At this time, the first condensing patterns 154, as shown in FIG. 7, are formed regularly or irregularly on the surface of the first condensing film 152 so that their longitudinal axes are oriented in the first direction (X axis).

The first condensing patterns 154 serve to diffuse the incident light in the same manner as the diffusion sheet 140 and condense the light in the same manner as the prism sheets. The first condensing patterns 154 have a better condensing efficiency of light incident in a horizontal direction (X axis) than condensing efficiency of the light incident in a vertical direction (Y axis).

Therefore, the first condensing sheet 150 diffuses the light from the diffusion sheet 140 and at the same time condenses the light in a horizontal direction (X axis) to then enter the second condensing sheet 160.

The second condensing sheet 160 includes a second condensing film 162 of polyester(PET) and a plurality of second elliptical condensing patterns 164 formed on the second condensing film 162 in the second direction (Y axis).

The second elliptical condensing patterns 164 are formed on a surface of the second condensing film 162 using the same method as that of the first condensing patterns 154.

Figure 8:
FIG. 8 is a photograph illustrating a surface of a second condensing sheet shown in FIG. 6.

At this time, the second condensing patterns 164, as shown in FIG. 8, are formed regularly or irregularly on the surface of the second condensing film 162 so that their longitudinal axes are oriented in a second direction (Y axis).

The second condensing patterns 164 serve to diffuse the incident light in the same manner as the diffusion sheet 140 and condense the light in the same manner as the prism sheets. The second condensing patterns 164 have a better condensing efficiency of the light incident in a vertical direction (Y axis) than the condensing efficiency of the light incident in a horizontal direction (X axis).

Therefore, the second condensing sheet 160 diffuses the light condensed in the horizontal axis by the first condensing sheet 150 and at the same time further condenses the light in the vertical direction and emits the condensed light to the outside.

Meanwhile, the first and second condensing sheets 150 and 160 control the condensing characteristics of horizontal (X axis)/vertical (Y axis) directions, viewing angle in a diagonal direction, specular/haze components, and a center peak angle of light distribution depending on the first and second condensing patterns 154 and 164.

Figure 9:
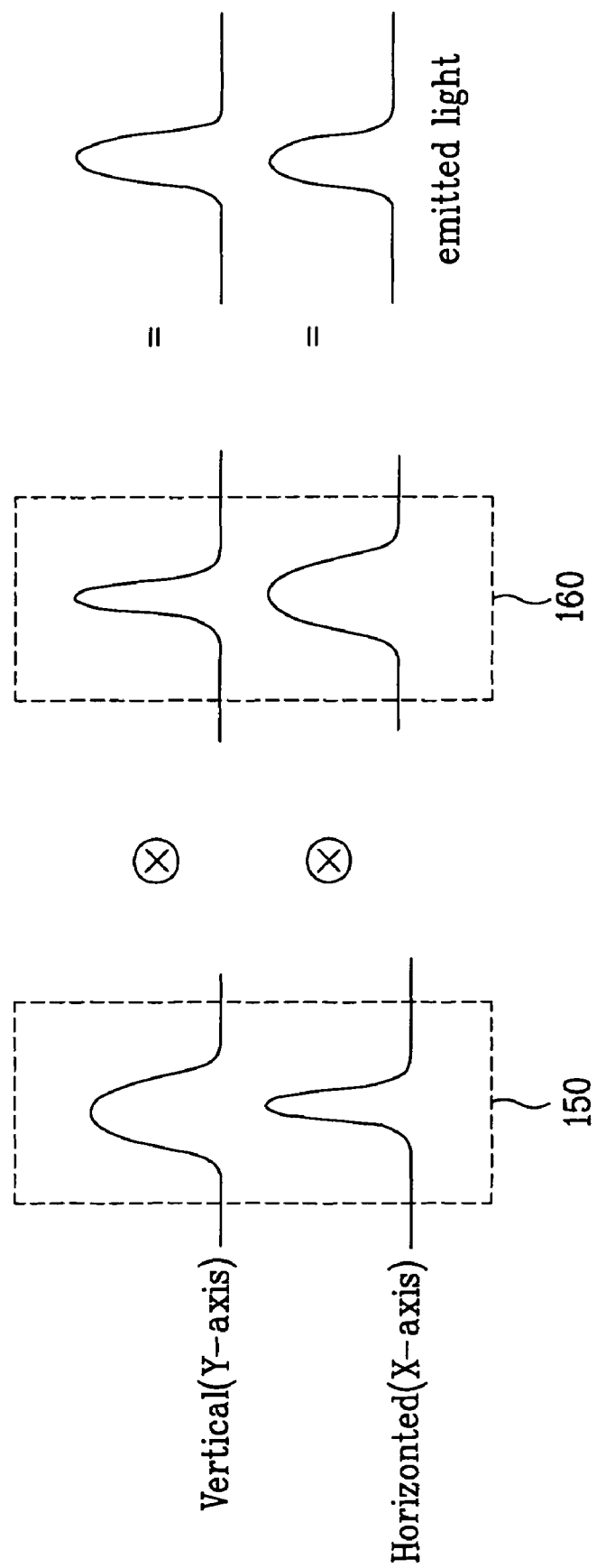
FIG. 9 illustrates a profile of light transmitting first and second condensing sheets shown in FIG. 6.

If the light diffused from the diffusion sheet 140 transmits the first and second condensing sheets 150 and 160, as shown in FIG. 9, the emitting light is determined by multiplying the light of the first condensing sheet by the light of the second condensing sheet. Therefore, condensing characteristics in the horizontal direction (X axis) become the same as condensing characteristics in the vertical direction (Y axis).

As a result, in the back light unit according to the first embodiment of the present invention, the longitudinal directions of the first and second condensing patterns 154 and 164 respectively formed in the first and second condensing sheets 150 and 160 cross in vertical and horizontal directions to mutually compensate condensing characteristics in horizontal (X axis)/vertical (Y axis) directions of the first and second condensing sheets 150 and 160. Thus, it is possible to improve the condensing efficiency and viewing angle symmetry.

Furthermore, in the back light unit according to the first embodiment of the present invention, it is possible to improve the condensing efficiency and viewing angle symmetry using only the first and second condensing sheets 150 and 160 provided with the first and second condensing patterns 154 and 164 without an additional diffusion sheet.

Figure 10:
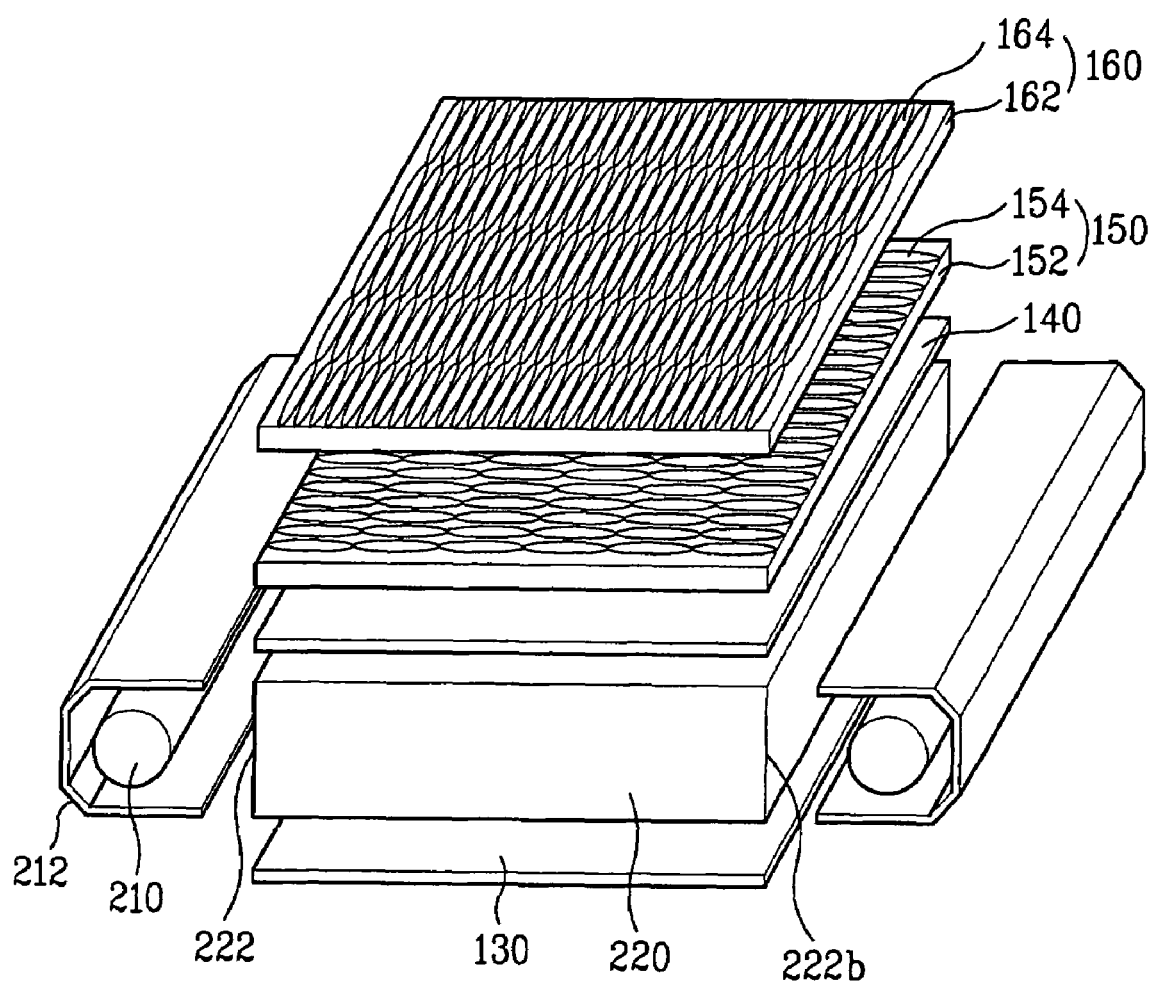
FIG. 10 illustrates a back light unit according to the second embodiment of the present invention.

FIG. 10 illustrates a back light unit according to the second embodiment of the present invention.

As shown in FIG. 10, the back light unit according to the second embodiment of the present invention includes a flat light guide plate 220 acting as a surface light source through inner dispersion of light entered through incident surfaces 222, at least one lamp 210 arranged to face the incident surfaces 222 at both sides of the flat light guide plate 220, a lamp housing 212 arranged to surround the incident surfaces 222 of the light guide plate 220 and the lamp 210, a reflecting plate 130 arranged below the light guide plate 220, a diffusion sheet 140 arranged above the light guide plate 220 to diffuse the light passing through the light guide plate 220, a first condensing sheet 150 condensing the light from the diffusion sheet 140 using a plurality of first elliptical condensing patterns 154 arranged on the diffusion sheet 140 in a first direction (X axis), and a second condensing sheet 160 further condensing the light from the first condensing sheet 150 using a plurality of second elliptical condensing patterns 164 arranged on the first condensing sheet 150 in a second direction (Y axis).

The back light unit according to the second embodiment of the present invention has the same construction as that of the back light unit according to the first embodiment of the present invention except for the flat light guide plate 220 and at least one lamp 210.

In the back light unit according to the second embodiment of the present invention, the light enters both sides of the flat light guide plate 220 through at least one lamp 210 so as to improve luminance of the light emitted to the outside.

Furthermore, in the back light unit according to the second embodiment of the present invention, the longitudinal directions of the first and second condensing patterns 154 and 164 respectively formed in the first and second condensing sheets 150 and 160 cross in vertical and horizontal directions to mutually compensate condensing characteristics in horizontal (X axis)/vertical (Y axis) directions of the first and second condensing sheets 150 and 160. Thus, it is possible to improve the condensing efficiency and viewing angle symmetry.

Figure 11:
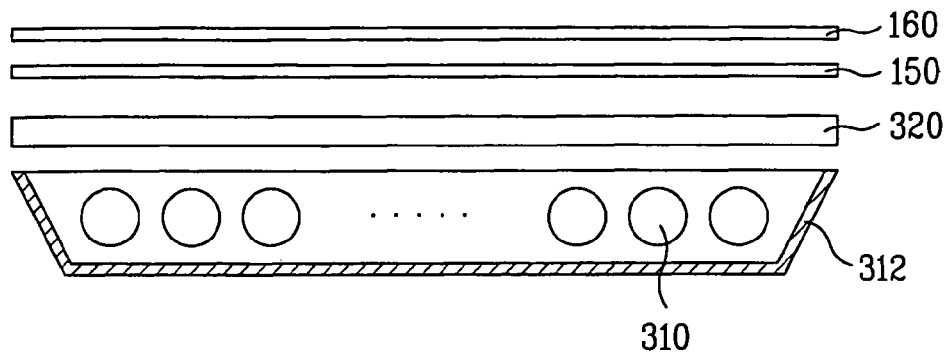
FIG. 11 illustrates a back light unit according to the third embodiment of the present invention.

FIG. 11 illustrates a back light unit according to the third embodiment of the present invention.

As shown in FIG. 11, the back light unit according to the third embodiment of the present invention includes a plurality of lamps 310 generating light, a bottom cover 312 receiving the lamps 310, a diffusion plate 320 arranged to cover a top surface of the bottom cover 312, diffusing the light from the lamps 310 across the entire surface of the back light unit, a first condensing sheet 150 condensing the light from the diffusion plate 320 using a plurality of first elliptical condensing patterns 154 arranged on the diffusion plate 150 in a first direction (X axis), and a second condensing sheet 160 further condensing the light from the first condensing sheet 150 using a plurality of second elliptical condensing patterns 164 arranged on the first condensing sheet 150 in a second direction (Y axis) crossing the first direction.

Generally, the lamp 310 is a cold cathode fluorescent lamp. The lamps 310 are driven by a lamp driving voltage from an inverter (not shown) and emit light to a rear surface of the diffusion plate 320.

The bottom cover 312 supports the lamps 310 and receives them. The bottom cover 312 has a reflecting sheet (not shown) to reflect the incident light from the lamps 310 toward the diffusion plate 320.

The diffusion plate 320 is arranged to cover the top surface of the bottom cover 312 and diffuses the light incident from the lamps and the reflecting sheet of the bottom cover 312 across the entire diffusion plate 320 irradiate the diffused light to the first condensing sheet 150.

The first and second condensing sheets 150 and 160 have the same structure as those of the back light unit according to the first embodiment of the present invention. Therefore, their detailed description will be omitted.

In the back light unit according to the third embodiment of the present invention, the light from the lamps 310 is directly irradiated to the rear surface of the diffusion plate 320 so as to improve luminance of the light emitted to the outside.

Furthermore, in the back light unit according to the third embodiment of the present invention, the longitudinal directions of the first and second condensing patterns 154 and 164 respectively formed in the first and second condensing sheets 150 and 160 cross in vertical and horizontal directions to mutually compensate condensing characteristics in horizontal (X axis)/vertical (Y axis) directions of the first and second condensing sheets 150 and 160. Thus, it is possible to improve the condensing efficiency and viewing angle symmetry.

Figure 12:
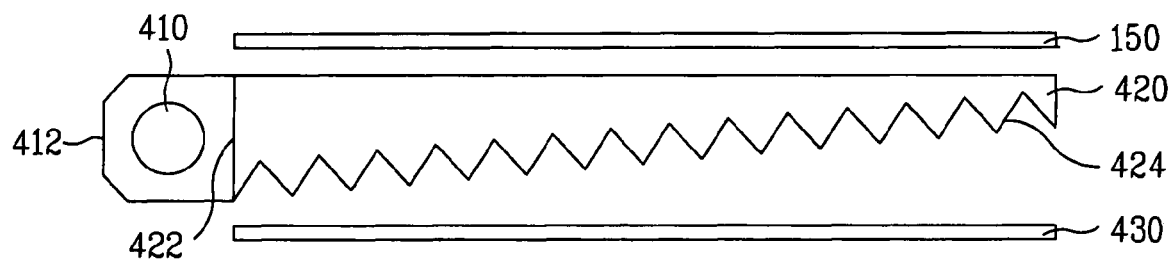
FIG. 12 illustrates a back light unit according to the fourth embodiment of the present invention.

FIG. 12 illustrates a back light unit according to a fourth embodiment of the present invention.

As shown in FIG. 12, the back light unit according to the fourth embodiment of the present invention includes a lamp 410 generating light, an inversion prism light guide plate 420 acting as a surface light source by dispersion of the light generated from the lamp 410 and entered through an incident surface 422, using a plurality of inversion prism peaks 424 formed on a tilted rear surface in a first direction (Y axis), a lamp housing 412 arranged to surround the incident surface 422 of the light guide plate 420 and the lamp 410, a reflecting plate 430 arranged below the light guide plate 420, and a condensing sheet 150 condensing the light from the inversion prism light guide plate 420 using an elliptical condensing pattern arranged on the inversion prism light guide plate 420 in a second direction (X axis) crossing the first direction.

Generally, the lamp 410 is a cold cathode fluorescent lamp. The lamp 410 is driven by a lamp driving voltage from an inverter (not shown) and emits light to the incident surface 422 at a side of the inversion prism light guide plate 420.

The lamp housing 412 is arranged at the side of the inversion prism light guide plate 420 to surround the lamp 410 and the incident surface 422 of the inversion prism light guide plate 420. The lamp housing 412 has a reflecting surface therein to reflect the light from the lamp 410 toward the incident surface 422 of the inversion prism light guide plate 420.

The inversion prism light guide plate 420 has a wedge shape to allow the light emitted from the lamp 410 to reach an area farthest away from the lamp 410 and converts the incident light to a light plane towards the condensing sheet 150.

In other words, a lower surface of the inversion prism light guide plate 420 is tilted at a predetermined angle to direct the light from the incident surface 422 to the condensing sheet 150.

A plurality of inversion prism peaks 424 having peaks and recesses are formed on a tilted rear surface of the inversion prism light guide plate 420. The inversion prism peaks 424 are formed side by side on the tiled rear surface of the inversion prism light guide plate 420 in a stripe shape in the first direction (Y axis).

The inversion prism light guide plate 420 condenses the incident light from the lamp 410 through the incident surface 422 in a vertical direction (Y axis) using the inversion prism peaks 424 and enters the condensed light to the condensing sheet 150.

The reflecting plate 430 is arranged below the inversion prism light guide plate 420 to reflect the light exiting the rear surface of the inversion prism light guide plate 420 back toward the inversion prism light guide plate 420 so as to reduce light loss.

The condensing sheet 150, as shown in FIG. 12, includes an elliptical condensing pattern 154 formed on a condensing film in the second direction (X axis).

The elliptical condensing pattern 154 is formed on a surface of the condensing film to have an asymmetrical or unbalanced elliptical shape of several μm using a holographic method.

At this time, the condensing pattern 154 is formed regularly or irregularly on the surface of the condensing film so that its longitudinal axis is oriented in the second direction (X axis).

The condensing pattern 154 serves to diffuse the incident light and at the same time condense the light. The condensing pattern 154 has a better condensing efficiency of the light in a horizontal axis (X axis) than the condensing efficiency of the light in a vertical axis (Y axis).

Therefore, the condensing sheet 150 diffuses the light from the inversion light guide plate 420 and at the same time condenses the light in a horizontal direction (X axis).

In the back light unit according to the fourth embodiment of the present invention, the inversion prism peaks 424 formed on the tilted rear surface of the inversion prism light guide plate 420 and the elliptical condensing pattern 154 formed in the condensing sheet 150 cross in vertical and horizontal directions to mutually compensate condensing characteristics in horizontal (X axis)/vertical (Y axis) directions of the inversion prism peaks 424 in the first direction (Y axis) and the condensing sheet in the second direction (X axis). Thus, it is possible to improve the condensing efficiency and viewing angle symmetry.

Figure 13:
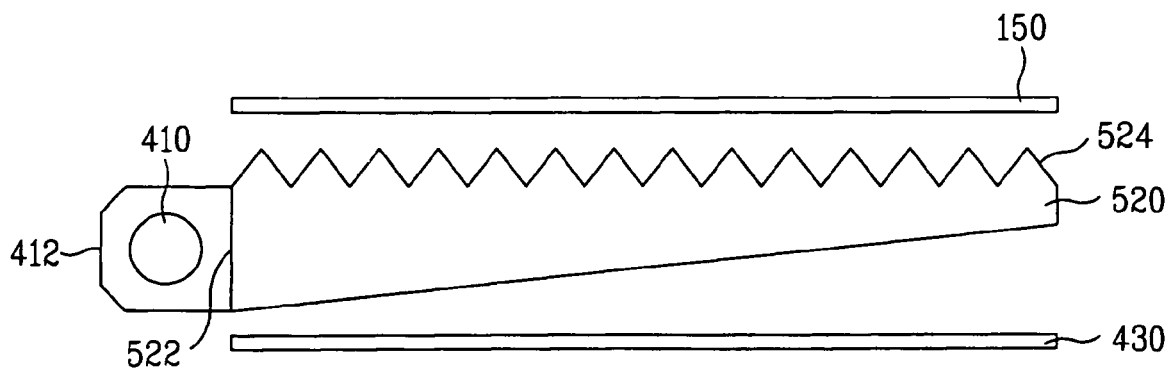
FIG. 13 illustrates a back light unit according to the fifth embodiment of the present invention.

FIG. 13 illustrates a back light unit according to a fifth embodiment of the present invention.

As shown in FIG. 13, the back light unit according to the fifth embodiment of the present invention includes a lamp 410 generating light, a prism light guide plate 520 acting as a surface light source by dispersion of the light generated from the lamp 410 and entered through an incident surface 522, using a plurality of inversion prism peaks 524 formed on the entire surface in a first direction (Y axis), a lamp housing 412 arranged to surround the incident surface 522 of the prism light guide plate 520 and the lamp 410, a reflecting plate 430 arranged below the prism light guide plate 520, and a condensing sheet 150 condensing the light from the prism light guide plate 520 using an elliptical condensing pattern arranged on the prism light guide plate 520 in a second direction (X axis) vertically crossing the first direction.

The back light unit according to the fifth embodiment of the present invention has the same construction as that of the back light unit according to the fourth embodiment of the present invention except for the prism light guide plate 520. Therefore, the detailed description of the other elements except for the prism light guide plate 520 will be omitted.

The prism light guide plate 520 has a wedge shape to allow the light emitted from the lamp 410 to reach an area furthest away from the lamp 410 and converts the incident light to plane light to guide the converted light to the condensing sheet 150.

To this end, a lower surface of the prism light guide plate 520 is tilted at a predetermined angle, and is provided with a printing pattern formed on a tilted rear surface.

A plurality of prism peaks 524 are formed on the entire surface of the prism light guide plate 520 in the first direction (Y axis) to condense the plane light from the tilted rear surface.

The printing pattern reflects the incident light from the incident surface 522 to spread the light across the entire surface.

The prism peaks 524 are formed side by side on the entire surface of the prism light guide plate 520 in a stripe shape in the first direction (Y axis). Each prism peak 524 has first and second tilt surfaces tilted from its angular point at a predetermined angle.

The prism light guide plate 520 condenses the incident light from the lamp 410 through the incident surface 522 in a vertical direction (Y axis) using the prism peaks 524 and enters the condensed light to the condensing sheet 150.

In the back light unit according to the fifth embodiment of the present invention, the prism peaks 524 formed on the entire surface of the prism light guide plate 520 and the condensing pattern 154 formed on the condensing sheet 150 cross in vertical and horizontal directions to mutually compensate condensing characteristics in horizontal (X axis)/vertical (Y axis) directions of the prism peaks 524 in the first direction (Y axis) and the condensing sheet 150 in the second direction (X axis). Thus, it is possible to improve the condensing efficiency and the viewing angle symmetry.

Figure 14:
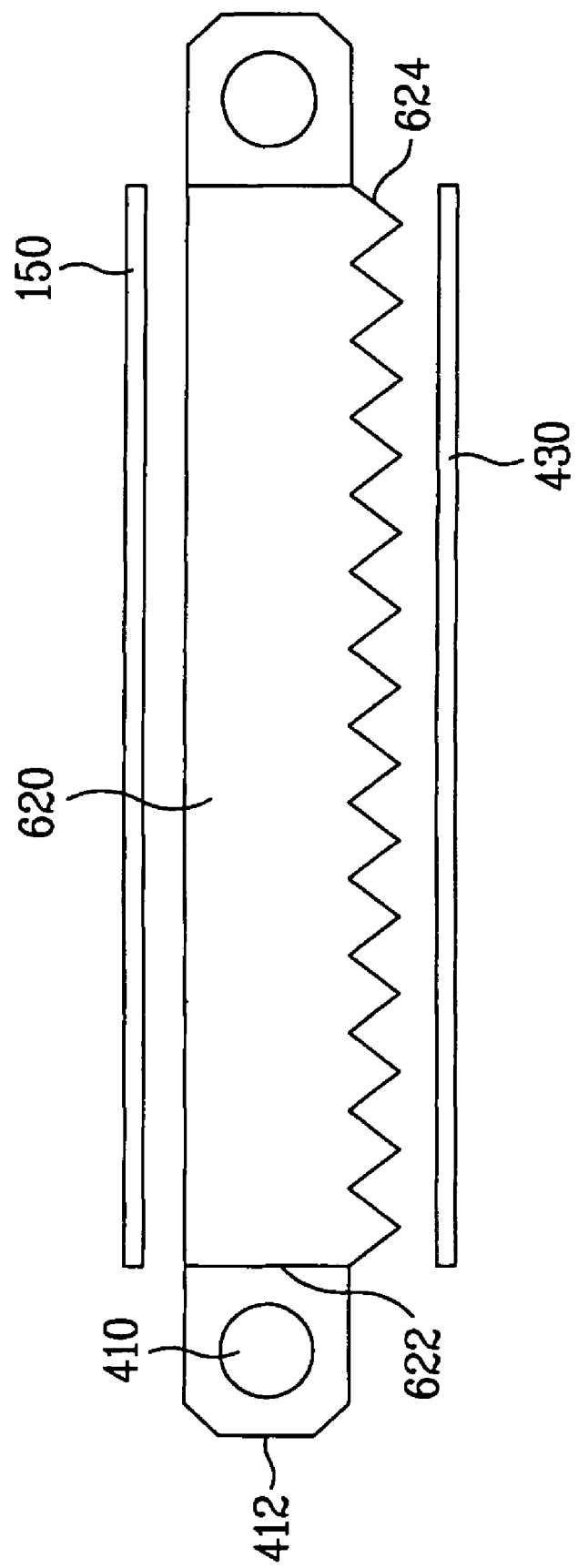
FIG. 14 illustrates a back light unit according to the sixth embodiment of the present invention.

FIG. 14 illustrates a back light unit according to the sixth embodiment of the present invention.

As shown in FIG. 14, the back light unit according to the sixth embodiment of the present invention includes a flat inversion prism light guide plate 620 acting as plane light source emitted through incident surfaces 622 formed at both sides, using a plurality of inversion prism peaks 624 formed on a rear surface in a first direction (Y axis), at least one lamp 410 arranged to face the incident surfaces 622 at both sides of the flat inversion prism light guide plate 620, a lamp housing 412 arranged to surround the incident surfaces 622 of the flat inversion light guide plate 620 and the lamp 410, a reflecting plate 430 arranged below the flat inversion prism light guide plate 620, and a condensing sheet 150 condensing the light from the flat inversion prism light guide plate 620 using an elliptical condensing pattern formed in a second direction (X axis) vertically crossing the first direction.

The back light unit according to the sixth embodiment of the present invention has the same construction as that of the back light unit according to the fourth embodiment of the present invention except for the flat inversion prism light guide plate 620 and at least one lamp 410.

The inversion prism peaks 624 are formed side by side on the rear surface of the flat inversion prism light guide plate 620 in a stripe shape in the first direction (Y axis). Each inversion prism peak 624 has first and second tilt surfaces tilted from its angular point at a predetermined angle.

The flat inversion prism light guide plate 620 condenses the light incident through the incident surface 622 in a vertical direction (Y axis) using the inversion prism peaks 624 and transmits the condensed light toward the condensing sheet 150.

In the back light unit according to the sixth embodiment of the present invention, the light enters both sides of the flat inversion prism light guide plate 620 through at least one lamp 410 so as to improve the luminance of the light emitted to the outside.

Furthermore, in the back light unit according to the sixth embodiment of the present invention, the inversion prism peaks 624 formed on the rear surface of the flat inversion prism light guide plate 620 and the condensing pattern 154 formed in the condensing sheet 150 cross in vertical and horizontal directions to mutually compensate condensing characteristics in horizontal (X axis)/vertical (Y axis) directions of the inversion prism peaks 624 in the first direction (Y axis) and the condensing sheet 150 in the second direction (X axis). Thus, it is possible to improve the condensing efficiency and the viewing angle symmetry.

Figure 15:
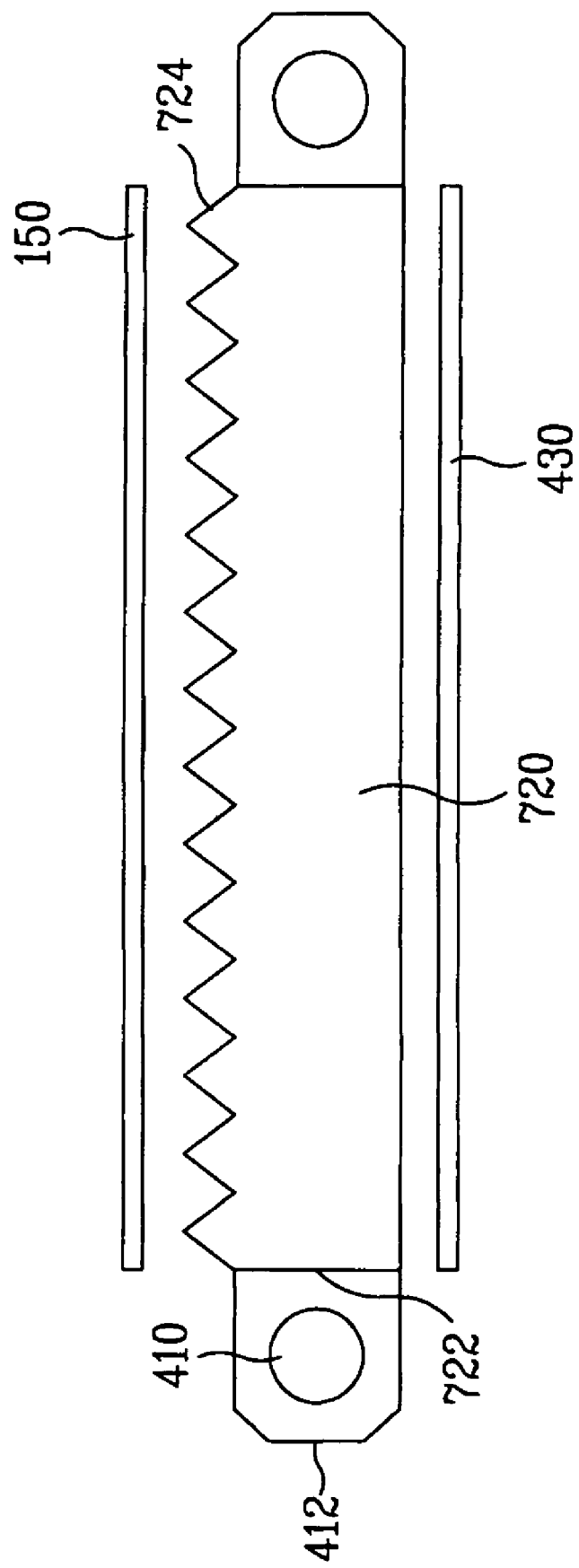
FIG. 15 illustrates a back light unit according to the seventh embodiment of the present invention.

FIG. 15 illustrates a back light unit according to the seventh embodiment of the present invention.

As shown in FIG. 15, the back light unit according to the seventh embodiment of the present invention includes a flat prism light guide plate 720 acting as a plane light source of light emitted through incident surfaces 722 formed at both sides, using a plurality of prism peaks 724 formed on the entire surface in a first direction (Y axis), at least one lamp 410 arranged to face the incident surfaces 722 at both sides of the flat prism light guide plate 720, a lamp housing 412 arranged to surround the incident surfaces 722 of the flat light guide plate 720 and the lamp 410, a reflecting plate 430 arranged below the flat prism light guide plate 720, and a condensing sheet 150 condensing the light from the flat prism light guide plate 720 using an elliptical condensing pattern formed in a second direction (X axis) vertically crossing the first direction.

The back light unit according to the seventh embodiment of the present invention has the same construction as that of the back light unit according to the sixth embodiment of the present invention except for the flat prism light guide plate 720.

The prism peaks 724 are formed side by side on the entire surface of the flat prism light guide plate 720 in a stripe shape in the first direction (Y axis). Each prism peak 724 has first and second tilt surfaces tilted at a predetermined angle.

The flat prism light guide plate 720 condenses the incident light from the lamp 410 through the incident surfaces 722 in a vertical direction (Y axis) using the prism peaks 724 and enters the condensed light to the condensing sheet 150.

In the back light unit according to the seventh embodiment of the present invention, the light enters both sides of the flat prism light guide plate 720 through at least one lamp 410 so as to improve the luminance of the light emitted to the outside.

Furthermore, in the back light unit according to the seventh embodiment of the present invention, the prism peaks 724 formed on the entire surface of the flat prism light guide plate 720 and the condensing pattern 154 formed on the condensing sheet 150 cross in vertical and horizontal directions to mutually compensate condensing characteristics in horizontal (X axis)/vertical (Y axis) directions of the prism peaks 724 in the first direction (Y axis) and the condensing sheet 150 in the second direction (X axis). Thus, it is possible to improve the condensing efficiency and the viewing angle symmetry.

Figure 16:
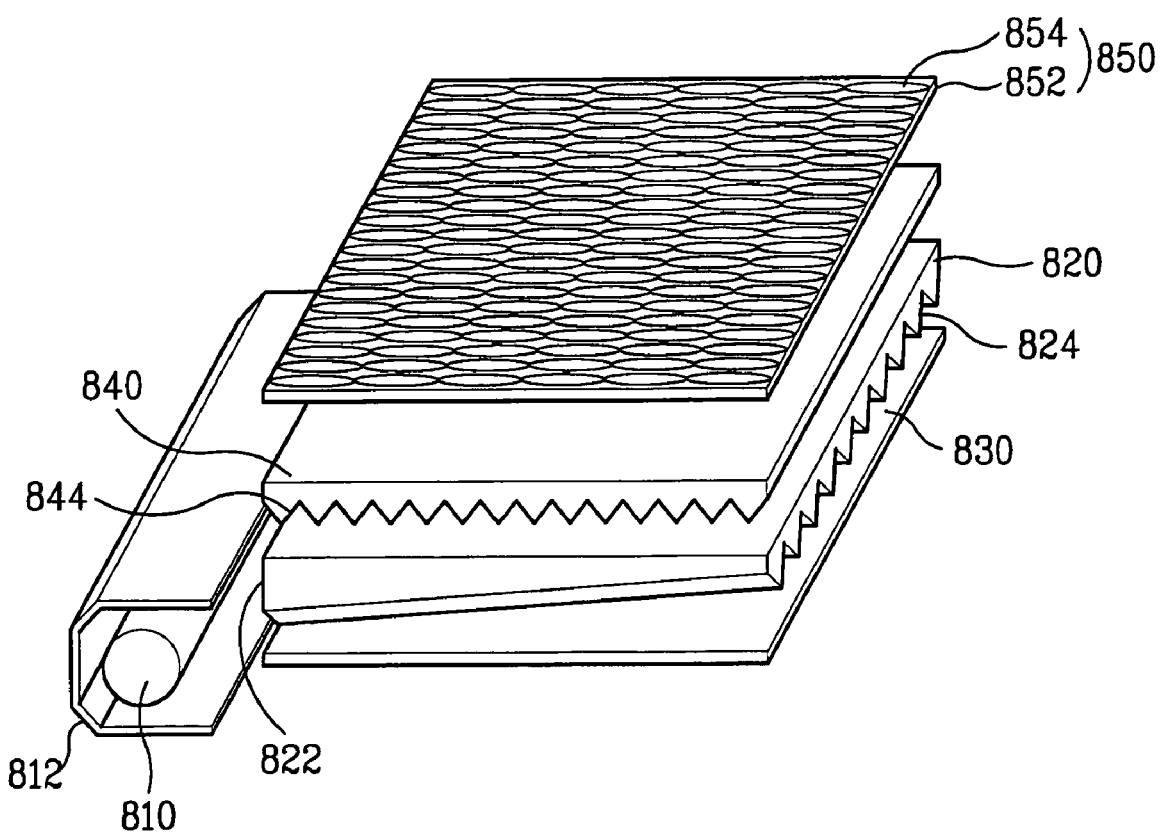
FIG. 16 illustrates a back light unit according to the eighth embodiment of the present invention.

FIG. 16 illustrates a back light unit according to the eighth embodiment of the present invention.

As shown in FIG. 16, the back light unit according to the eighth embodiment of the present invention includes a lamp 810 generating light, an inversion prism light guide plate 820 acting as a plane light source of light emitted from the lamp 810 through an incident surface 822 formed at a side, using a plurality of first inversion prism peaks 824 formed in a first direction (X axis), a lamp housing 812 arranged to surround the incident surface 822 of the inversion prism light guide plate 820 and the lamp 810, a reflecting plate 830 arranged below the inversion prism light guide plate 820, a first condensing sheet 840 condensing the light passing through the inversion prism light guide plate 820 using a plurality of second inversion prism peaks 844 arranged on the inversion prism light guide plate 820 in a second direction (Y axis) crossing the first direction, and a second condensing sheet 850 condensing again the light from the first condensing sheet 840 using a plurality of elliptical condensing patterns 854 arranged in the first direction.

A cold cathode fluorescent lamp is typically used as the lamp 810. The lamp 810 is driven by a lamp driving voltage from an inverter (not shown) and emits light to the incident surface 822 at the side of the inversion prism light guide plate 820.

The lamp housing 812 is arranged at the side of the inversion prism light guide plate 820 to surround the lamp 810 and the incident surface 822 of the inversion prism light guide plate 820.

The lamp housing 812 has a reflecting surface therein to reflect the light from the lamp 810 toward the incident surface 822 of the inversion prism light guide plate 820.

The inversion prism light guide plate 820 has a wedge shape to allow the incident light emitted from the lamp 910 to reach an area far away from the lamp 810 and converts the light into plane light to guide the converted light to the first condensing sheet 840.

In other words, a lower surface of the inversion prism light guide plate 820 is tilted at a predetermined angle to direct the incident light from the incident surface 822 toward the first condensing sheet 840.

A plurality of first inversion prism peaks 824 having peaks and recesses are formed on a tilted rear surface of the inversion prism light guide plate 820. The first inversion prism peaks 824 are formed side by side on the tiled rear surface of the inversion prism light guide plate 820 in a stripe shape in the first direction (X axis).

Each first inversion prism peak 824 has first and second tilt surfaces tilted at a predetermined angle.

The inversion prism light guide plate 820 condenses the incident light from the lamp 810 through the incident surface 822 using the first inversion prism peaks 824 and emits the condensed light toward the first condensing sheet 840.

The first condensing sheet 840 condenses the light passing through the inversion prism light guide plate 820 using the second inversion prism peaks 844 and emits the condensed light to the second condensing sheet 850.

The second inversion prism peaks 844 are formed side by side on a rear surface of a first condensing film in a stripe shape of the second direction (Y axis).

Each second inversion prism peak 844 has first and second tilt surfaces tilted at a predetermined angle.

The reflecting plate 830 is arranged below the inversion prism light guide plate 820 to reflect the light entering through the rear surface of the inversion prism light guide plate 820 back towards the inversion prism light guide plate 820 so as to reduce light loss.

The second condensing sheet 850 includes a second condensing film 852 of polyester(PET) and a plurality of elliptical condensing patterns 854 formed on the second condensing film 852 in the second direction (Y axis).

The elliptical condensing patterns 854 are formed on a surface of the second condensing film 852 to respectively have an asymmetrical or unbalanced elliptical shape of several μm using a holographic method.

At this time, the elliptical condensing patterns 854 are formed regularly or irregularly on the surface of the second condensing film 852 so that their longitudinal axes are oriented along the first direction (X axis).

The elliptical condensing patterns 854 serve to diffuse the incident light and at the same time condense the light. The elliptical condensing patterns 854 have more excellent condensing efficiency of the incident light in a horizontal axis (X axis) than condensing efficiency of the incident light in a vertical axis (Y axis).

Therefore, the second condensing sheet 850 diffuses the incident light from the first condensing sheet 840 and at the same time condenses the light in the horizontal direction (X axis) to emit the condensed light.

In the back light unit according to the eighth embodiment of the present invention, the light generated from the lamp 810 is converted into a uniform plane of light by the first inversion prism peaks 824 formed on the tilt surface below the inversion prism light guide plate 820 in the first direction (X axis) and is condensed by the second inversion prism peaks 844 formed on the rear surface of the first condensing sheet 840 in the second direction (Y axis).

Figure 17:
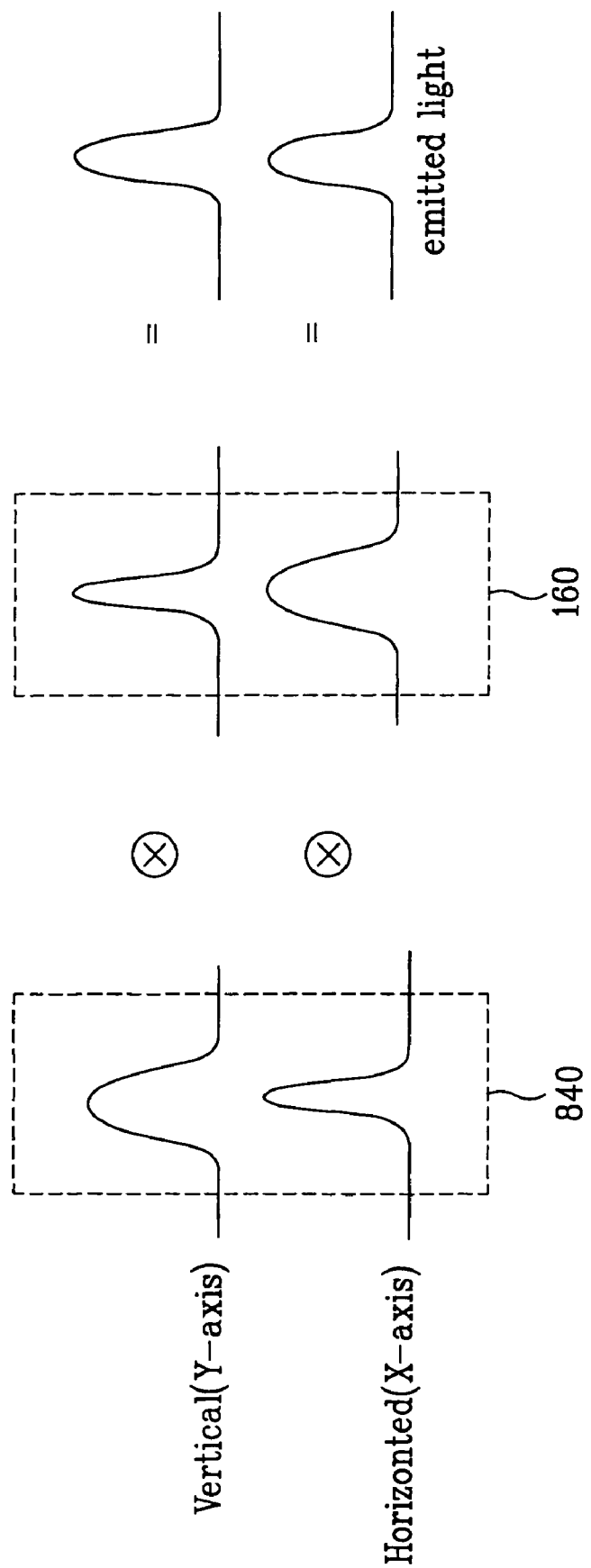
FIG. 17 illustrates a profile of light transmitting an inversion prism light guide plate and first and second condensing sheets shown in FIG. 16.

Thus, the light transmitted by the inversion prism light guide plate 820 and the first condensing sheet 840 is condensed in the second direction (Y axis) and enters the second condensing sheet 850 as shown in FIG. 17.

Also, the light condensed in the second direction (Y axis) after transmitting the first condensing sheet 840 is again condensed by the elliptical condensing patterns 854 formed on the second condensing film 852 in the first direction (X axis). The condensed light is then emitted.

Therefore, in the back light unit according to the eighth embodiment of the present invention, the inversion prism peaks 824 formed in the inversion prism light guide plate 820, the second inversion prism peaks 844 formed in the first condensing sheet 840 and the elliptical condensing patterns 854 formed in the second condensing sheet 850 cross in vertical and horizontal directions to mutually compensate condensing characteristics in horizontal (X axis)/vertical (Y axis) directions of the inversion prism light guide plate 820 and the first and second condensing sheets 840 and 850. Thus, it is possible to improve condensing efficiency and viewing angle symmetry.

Furthermore, the back light unit according to the eighth embodiment of the present invention may further include a third condensing sheet having a plurality of elliptical condensing patterns formed in the second direction (Y axis) to cross the elliptical condensing patterns 854 formed on the second condensing sheet 850 in the first direction (X axis).

Meanwhile, the back light unit according to the eighth embodiment of the present invention may include at least one lamp 810 at both sides of the inversion prism light guide plate 820. At this time, the inversion prism light guide plate 820 has a flat shape.

As described above, the back light unit according to the present invention has the following advantages.

The longitudinal directions of the plurality of elliptical condensing patterns formed on the light guide plate cross in vertical and horizontal directions to mutually compensate condensing characteristics in horizontal (X axis)/vertical (Y axis) directions of the respective condensing sheets. Thus, it is possible to improve the condensing efficiency and the viewing angle symmetry.

In addition, the prism light guide plate having a plurality of prism peaks and the condensing sheet having a plurality of elliptical condensing patterns cross in vertical and horizontal directions to mutually compensate condensing characteristics in horizontal (X axis)/vertical (Y axis) directions of the respective condensing sheets. Thus, it is possible to improve condensing efficiency and viewing angle symmetry.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A back light unit comprising:
   at least one lamp generating light;
   a light guide plate emitting light across a surface thereof using the light generated from the lamp;
   a diffusion sheet arranged above the light guide plate to diffuse the light passing through the light guide plate;
   a first condensing sheet condensing the light from the diffusion sheet using a plurality of first elliptical condensing patterns repeatedly formed on a surface of a first condensing film in first direction and second direction crossing the first direction, wherein each of longitudinal axes of the first elliptical condensing patterns is parallel to one another in the first direction and each of short axes of the first elliptical condensing patterns is parallel to one another in the second direction; and
   a second condensing sheet further condensing the light from the first condensing sheet using a plurality of second elliptical condensing patterns repeatedly formed on a surface of a second condensing film in the first and the second direction, wherein each of longitudinal axes of the second elliptical condensing patterns is parallel to one another in the second direction and each of short axes of the second elliptical condensing patterns is parallel to one another in the first direction,
   wherein the first elliptical condensing patterns are formed on a surface of the first condensing film to respectively have an asymmetrical or unbalanced elliptical shape of several μm using a holographic method,
   wherein the second elliptical condensing patterns are formed on a surface of the second condensing film using the same method as that of the first condensing patterns.

2. The back light unit as claimed in claims 1, wherein the lamp is arranged at one side or both sides of the light guide plate.

3. The back light unit as claimed in claim 2, further including a lamp housing arranged at one side or both sides of the light guide plate to surround an incident surface of the light guide plate and the lamp and a reflecting plate arranged on the rear surface of the light guide plate.

4. A back light unit comprising:
   at least one lamp generating light;
   a prism light guide plate emitting light across a surface thereof from the lamp through an incident surface formed at a side of the prism light guide plate, using a plurality of first prism peaks formed in a first direction;
   a first condensing sheet condensing the light from the prism light guide plate using a plurality of second prism peaks formed in a second direction crossing the first direction; and
   a second condensing sheet further condensing the light from the first condensing sheet using a plurality of first elliptical condensing patterns repeatedly formed on a surface of a first condensing film in the first and second direction, wherein each of longitudinal axes of the first elliptical condensing patterns is parallel to one another in the first direction and each of short axes of the first elliptical condensing patterns is parallel to one another in the second direction.

5. The back light unit as claimed in claim 4, further comprising a third condensing sheet further condensing the light from the second condensing sheet using a plurality of second elliptical condensing patterns repeatedly formed on a surface of a second condensing film in the first and second direction, wherein each of longitudinal axes of the second elliptical condensing patterns is parallel to one another in the second direction and each of short axes of the second elliptical condensing patterns is parallel to one another in the first direction.

6. The back light unit as claimed in claim 4, wherein the lamp is arranged at one side or both sides of the light guide plate.

7. The back light unit as claimed in claim 6, further including a lamp housing arranged at one side or both sides of the light guide plate to surround the incident surface of the light guide plate and the lamp, and a reflecting plate arranged on the rear surface of the light guide plate.

8. A back light unit comprising:
   at least one lamp generating light;
   a prism light guide plate emitting light across the surface thereof from the lamp through an incident surface formed at a side of the prism light guide plate, using a plurality of prism peaks formed in a first direction; and a condensing sheet condensing the light from the prism light guide plate using a plurality of elliptical condensing patterns repeatedly formed on a surface of a condensing film in the first direction and second direction crossing the first direction, wherein each of longitudinal axes of the elliptical condensing patterns is parallel to one another in the second direction and each of short axes of the elliptical condensing patterns is parallel to one another in the first direction, wherein the elliptical condensing patterns are formed on a surface of the condensing film to respectively have an asymmetrical or unbalanced elliptical shape of several μm using a holographic method.

9. The back light unit as claimed in claim 8, wherein the prism light guide plate has a wedge shape resulting in a tilted rear surface.

10. The back light unit as claimed in claim 8, wherein the prism peaks are formed on one of an entire surface of the prism light guide plate and the tilted surface in the first direction.

11. The back light unit as claimed in claim 8, wherein the prism light guide plate has a flat shape.

12. The back light unit as claimed in claim 8, wherein the prism peaks are formed on either an entire surface or a rear surface of the prism light guide plate.

13. The back light unit as claimed in claims 8, wherein the lamp is arranged at one side or both sides of the light guide plate.

14. The back light unit as claimed in claim 13, further including a lamp housing arranged at one side or both sides of the light guide plate to surround the incident surface of the light guide plate and the lamp, and a reflecting plate arranged on the rear surface of the light guide plate.

15. A back light unit comprising:
a plurality of lamps generating light;
a bottom cover supporting and receiving the lamps;
a diffusion plate arranged to cover a top surface of the bottom cover, diffusing the light from the lamps;
a first condensing sheet condensing the light from the diffusion sheet using a plurality of first elliptical condensing patterns repeatedly formed on a same plan of a surface of a first condensing film in first direction and second direction crossing the first direction, wherein each of longitudinal axes of the first elliptical condensing patterns is parallel to one another in the first direction and each of short axes of the first elliptical condensing patterns is parallel to one another in the second direction;

a second condensing sheet further condensing the light from the first condensing sheet using a plurality of second elliptical condensing patterns repeatedly formed on a same plan of a surface of a second condensing film in the first and the second direction, wherein each of longitudinal axes of the second elliptical condensing patterns is parallel to one another in the second direction and each of short axes of the second elliptical condensing patterns is parallel to one another in the first direction, wherein the first elliptical condensing patterns are formed on a surface of the first condensing film to respectively have an asymmetrical or unbalanced elliptical shape of several μm using a holographic method, wherein the second elliptical condensing patterns are formed on a surface of the second condensing film using the same method as that of the first condensing patterns.

16. The back light unit as claimed in claim 1, wherein the elliptical condensing pattern has an asymmetrical or unbalanced elliptical shape by a holographic method.

17. The back light unit as claimed in claim 5, wherein the elliptical condensing pattern has an asymmetrical or unbalanced elliptical shape by a holographic method.

18. The back light unit as claimed in claim 8, wherein the elliptical condensing pattern has an asymmetrical or unbalanced elliptical shape by a holographic method.

19. The back light unit as claimed in claim 15, wherein the elliptical condensing pattern has an asymmetrical or unbalanced elliptical shape by a holographic method.

* * * * *